(12) United States Patent
Haubursin

(10) Patent No.: US 6,507,609 B1
(45) Date of Patent: Jan. 14, 2003

(54) MECHANISM FOR CAPTURING AND REPORTING INTERRUPT EVENTS OF DIFFERENT CLOCK DOMAINS

(75) Inventor: Pierre F. Haubursin, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/233,215

(22) Filed: Jan. 20, 1999

(51) Int. Cl.[7] ............................. H04B 1/38; G06F 13/24
(52) U.S. Cl. ....................................... 375/220; 710/260
(58) Field of Search ................................ 375/220, 219; 710/48, 262, 260, 261, 263, 266

(56) References Cited

U.S. PATENT DOCUMENTS

| | | | | |
|---|---|---|---|---|
| 5,384,906 A | * | 1/1995 | Horst | 709/400 |
| 5,708,814 A | * | 1/1998 | Short et al. | 710/260 |
| 5,708,817 A | * | 1/1998 | Ng et al. | 710/266 |
| 6,115,779 A | * | 9/2000 | Haubursin et al. | 710/262 |

* cited by examiner

*Primary Examiner*—Chi Pham
*Assistant Examiner*—Khai Tran

(57) ABSTRACT

A mechanism that captures and reports interrupt events occurred in various portions of a network interface controller. As different clocks control these interface controller portions, the interrupt request signals corresponding to the interrupt events are created in different clock domains. The first stage of the mechanism for capturing and reporting interrupt events detects interrupt events having different duration, and produces an interrupt synchronizing signal asserted during at least one period of a local clock signal. The second stage serves as a positive edge detector to produce an interrupt positive edge detect signal asserted during three clock periods. The third stage supports a read operation performed by a host signal corresponding to the detected interrupt event to read an interrupt request. Finally, the fourth stage of the mechanism for capturing and reporting interrupt events acts as an interrupt register to store an interrupt signal corresponding to the detected interrupt event and to produce an interrupt request signal sent to the host.

20 Claims, 4 Drawing Sheets

MECHANISM FOR CAPTURING AND REPORTING INTERRUPT EVENTS OF DIFFERENT CLOCK DOMAINS

FIELD OF THE INVENTION

The present invention relates to data networks, and more particularly, to an interrupt management system that handles interrupt signals produced in different clock domains.

BACKGROUND ART

The growth in computer applications that require heavy data traffic and the increasing availability of high-speed transmission lines and intelligent communication switches create a need for computer systems able to manage a huge amount of data at high rates. For example, high-speed communication networks may require a central processing unit (CPU) to be interrupted at rates of 20,000–100,000 interrupts per second in response to hundreds various events.

In a network controller chip, interrupt request signals to an external CPU may be produced to direct the CPU's attention to such events as a user intervention, system and memory errors, missed frames, reception and transmission operations, management operations, etc. Interrupt events may be originated in various portions of the controller. However, separate clocks may control operations in different portions of the controller. As a result, different interrupt events may be represented by interrupt signals of different duration.

An interrupt management block produces interrupt request signals supplied to an external CPU when an interrupt event occurs. As a local clock different from clocks associated with interrupt events may control the interrupt management unit, it would be desirable to provide a mechanism for capturing and reporting interrupt events of different clock domains.

DISCLOSURE OF THE INVENTION

Accordingly, a primary object of the present invention is to provide an interrupt management block able to capture and report interrupt events originated in network controller sections controlled by different clocks.

The above and other advantages of the invention are achieved, at least in part, by providing an interrupt management circuit that comprises an interrupt event detector for receiving an interrupt event signal representing an interrupt event that may occur in different units controlled by separate independent local clocks. An interrupt synchronizing signal produced by the interrupt event detector is used by an edge detector for generating an interrupt edge signal having a duration equal to a predetermined number of periods of a local clock signal that controls the interrupt management circuit. An interrupt read circuit is responsive to a read signal from the host for storing interrupt event data represented by the interrupt edge signal. An interrupt register is responsive to the interrupt event data transferred from the interrupt read circuit for producing interrupt request bits sent to the host.

In accordance with a first aspect of the invention, duration of the interrupt event signal may correspond to a time period during which the event represented by the interrupt event signal occurs. The interrupt event signal may have variable duration.

In accordance with a preferred embodiment of the present invention, the interrupt event detector may comprise a first flip-flop for receiving the interrupt event signal, and a second flip-flop coupled to the first flip-flop for producing the interrupt synchronizing signal. Also, the interrupt event detector may comprise a first OR gate having a first input coupled to an output of the first flip-flop, a second input coupled to an output of the second flip-flop, and an output connected to a data input of the first flip-flop. The interrupt event signal may be supplied to a reset input of the first flip-flop.

The edge detector may be adapted to produce the interrupt edge signal having an edge that coincides in time with an edge of the interrupt synchronizing signal, and duration equal to three periods of the local clock signal. The edge detector may comprise third, fourth and fifth flip-flops, and a second OR gate having a first input coupled to an output of the second flip-flop, a second input coupled to an output of the third flip-flop, and a third input connected to an output of the fourth flip-flop. Also, the edge detector may comprise a gate responsive to outputs of the second OR gate and the fifth flip-flop for producing the interrupt edge signal.

The interrupt read circuit may comprise a sixth flip-flop and a third OR gate having a first input coupled to an output of the sixth flip-flop and a second input supplied with the interrupt edge signal. A first multiplexer controlled by the read signal may be coupled between an output of the third OR gate and input of the sixth flip-flop. A second multiplexer may be coupled between the output of the OR gate and an input of the first multiplexer. The second multiplexer may be controlled by a read reset signal for resetting contents of the sixth flip-flop.

The interrupt register may comprise a seventh flip-flop for producing the interrupt request bits, and a third multiplexer having a first input connected to an output of the seventh flip-flop and a second input coupled to an output of the sixth flip-flop. The third multiplexer may be controlled by the read signal for maintaining the contents of the seventh flip-flop unchanged during an interrupt request read operation.

In accordance with another aspect of the invention, a data communication network comprises a host and a network adapter coupled to the host via a PCI bus. The network adapter has an interrupt capture and storage mechanism responsive to interrupt events of variable duration for producing an interrupt request signals transferred to the PCI bus to report the events to the host.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention will be described with the example of a network interface in a packet switched network, such as an Ethernet (EEE 802.3) network. It will become apparent, however, that the present invention is applicable to any output driver in any data processing system.

Figure 1A:
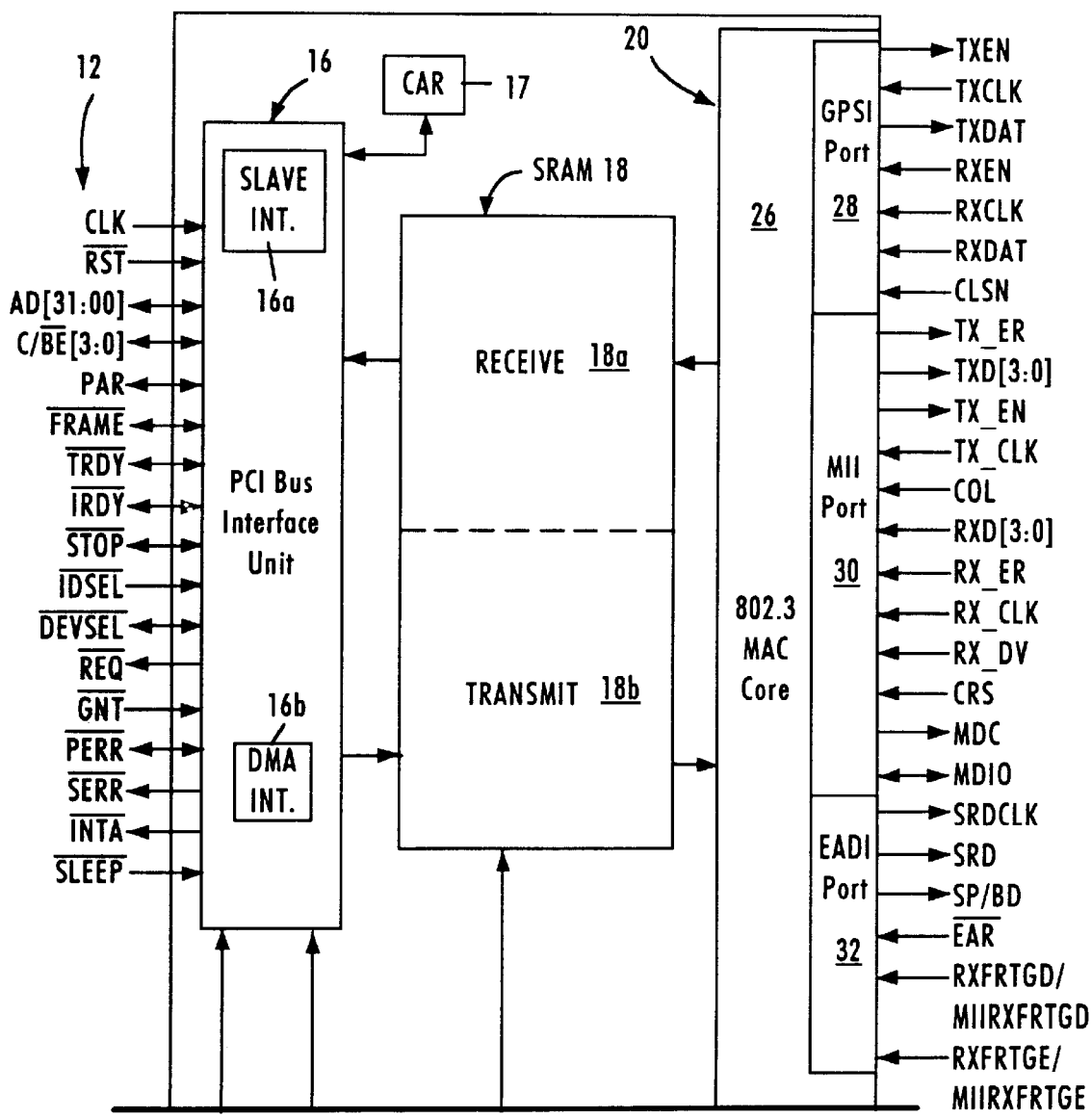
FIG. 1 is a block diagram illustrating an exemplary network interface that may contain the interrupt management circuit of the present invention.
Figure 1B:
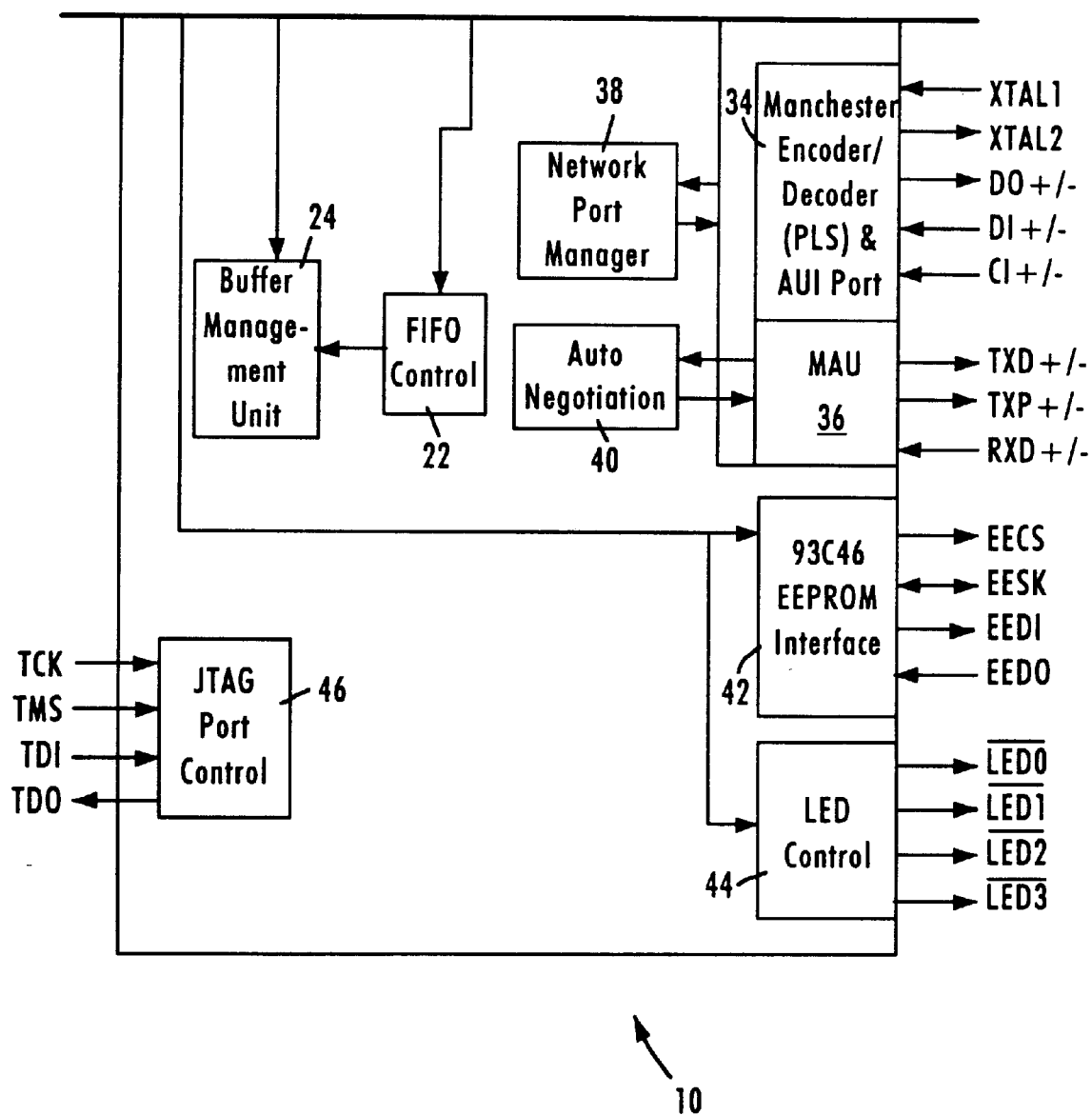

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A Control and Register (CAR) block 17 contains registers that support interactions between the PCI bus interface 16 and other blocks of the network interface 10. The CAR block 17 has a register interface to the PCI bus interface 16 to allow read and write accesses to the registers. For example, the CAR block comprises a command register that decodes commands from the CPU and sends command signals to other blocks of the network interface 10. The CAR block 17 is responsible for interrupt generation and batching. The CAR block 17 contains counters and timers for controlling interrupts and providing information to the CPU regarding latency and access time. Also, the CAR block 17 generates reset signals supplied to all other blocks of the interface 10, and provides input/output control.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

As discussed above, the PCI bus interface unit 16 has an interrupt request output INTA/ for supplying an external CPU or other host with an interrupt request signal. An interrupt management block may be provided in the CAR block 17 for capturing various interrupt events that may occur in the network interface 10, and producing an interrupt request signal to report the interrupt events to the CPU. For example, the interrupt management block may capture such interrupt events as transmit start, transmit interrupt, receive interrupt, overflow of a receive collision count, a system error, a memory error, MII auto-poll, user interrupt, etc. Interrupt signals produced by various circuits on the network interface chip represent the interrupt events.

As the circuits that originate interrupt events are controlled by different clocks, duration of various interrupt signals may differ. For example, the duration of some interrupt signals may be much less than the duration of the local clock signal that controls the interrupt management block. To ensure that the interrupt events representing by short interrupt signals are captured, the interrupt management block contains an interrupt capture and storage mechanism 100.

Figure 2:
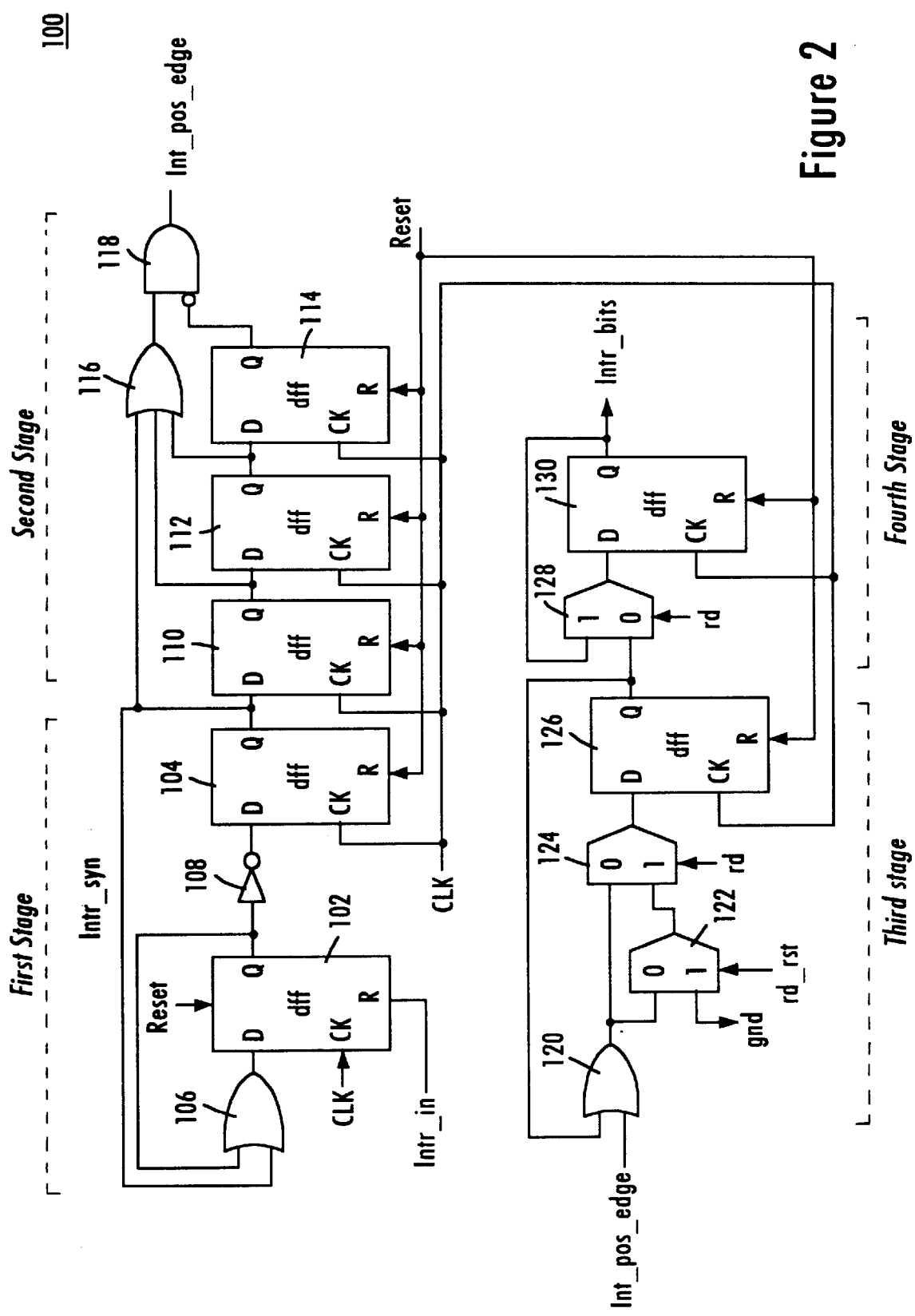
FIG. 2 is a diagram of an interrupt capture and storage mechanism in accordance with the present invention.

Referring to FIG. 2, the interrupt capture and storage mechanism 100 comprises four stages of logic elements. As discussed below, the interrupt capture and storage mechanism 100 includes multiple D flip-flops, each of which has a data input D, a clock input CK, a reset input R, and an output Q. The output of each D flip-flop changes on the clock rising edge.

The first stage of the interrupt capture and storage mechanism 100 is composed of D flip-flops 102 and 104, and an OR gate 106. The reset input R of the D flip-flop 102 is supplied with an interrupt signal intr_in (FIGS. 3a–3c) that represents an interrupt event. When an interrupt event occurs, the corresponding interrupt signal intr_in is brought into its active high-level state. The time, during which the intr_in signal is asserted, corresponds to the duration of the interrupt event.

The D input of the flip-flop 102 is coupled to the output of an OR gate 106 having one of its inputs connected to the Q output of the flip-flop 102. Via an inverter 108, the Q output of the flip-flop 102 is also coupled to the D input of the D flip-flop 104. The Q output of the flip-flop 104 is connected to the second input of the OR gate 106. CK inputs of the flip-flops 102 and 104 are supplied with a local clock signal clk (FIGS. 3a–3c) that provides synchronization in the interrupt management block.

Figure 3:
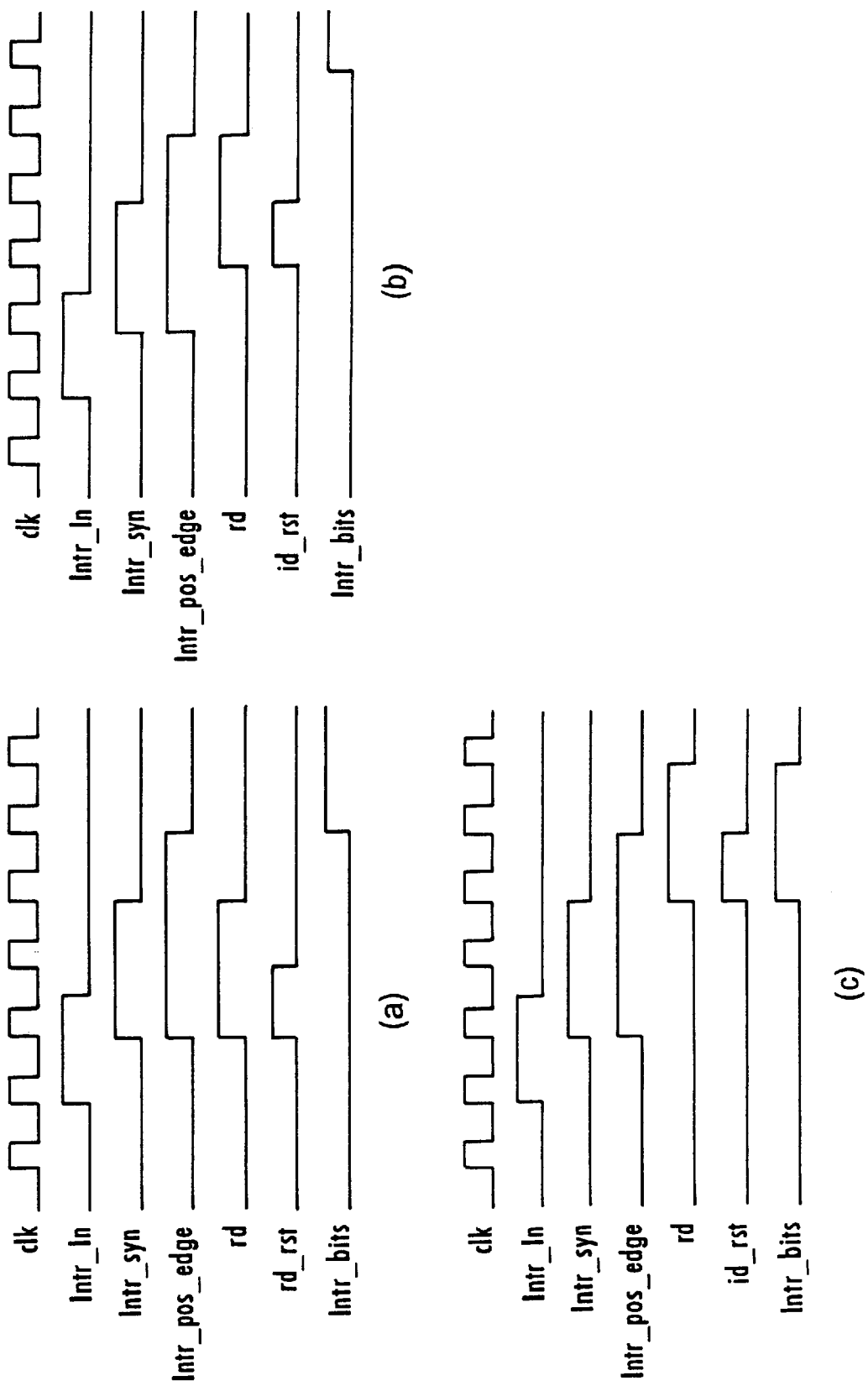
FIGS. 3a–3c are timing diagrams illustrating operation of the interrupt capture and storage mechanism.

The first stage of the mechanism 100 serves as a detector of interrupt events, and allows an interrupt event of any duration to be captured. Referring to FIGS. 3a–3c, an interrupt synchronizing signal intr_syn is produced at the Q output of the flip-flop 104 which corresponds to the output of the interrupt events detector. For short-term interrupt events, the interrupt event signal intr_in may be asserted during a time interval less than one period of the local clock signal clk. However, the intr_syn signal will be asserted during at least one period of the clk signal. As a result, even an interrupt event occurring over a very short period of time will be captured.

If the intr_in signal is asserted during more than one period of the clk signal, the intr_syn signal may be active during several periods of the clock signal clk.

The second stage of the interrupt capture and storage mechanism 100 comprises D flip-flops 110, 112, and 114 forming a positive edge detector. The D input of the flip-flop 110 is connected to the Q output of the flip-flop 104 to receive the intr_in signal. The Q output of the flip-flop 110 is coupled to the D input of the D flip-flop 112 having its Q output connected to the D input of the D flip-flop 114.

An OR gate 116 has three inputs respectfully connected to the Q outputs of the flip-flops 104, 110, and 112. The output of the OR gate 116 is coupled to the non-inverting input of an AND-NOT gate 118. The Q output of the D flip-flop 114 is connected to the inverting input of the AND-NOT gate 118. As a result, the output of the gate 118 produces an interrupt positive edge detect signal int_pos_edge (FIGS. 3a–3c) asserted when the intr_syn signal goes high. Accordingly, the int_os_edge signal goes to an active state when an interrupt event is captured by the interrupt capture and storage mechanism 100. The int_pos_edge signal remains active during three periods of the clock signal clk.

The third stage of the interrupt capture and storage mechanism 100 comprises an OR gate 120 having an input for receiving the int_pos_edge signal. Via multiplexers 122 and 124, the output of the OR gate 120 is coupled to the D input of a D flip-flop 126. Via a feedback loop, the Q output of the flip-flop 126 is connected to another input of the OR gate 120.

The multiplexer 122 has its logic 0 input connected to the output of the OR gate 120, and its logic 1 input grounded. A read reset signal rd_rst shown in FIGS. 3a–3c is supplied to the control input of the multiplexer 122. When the rd_rst signal is asserted, a 0 logic level from the grounded input is supplied to the output of the multiplexer 122. When the rd_rst signal is deasserted, the output of the OR gate 120 is produced at the output of the multiplexer 122.

The logic 0 input of the multiplexer 124 is connected to the output of the OR gate 120, whereas the logic 1 input of the multiplexer 124 is coupled to the output of the multiplexer 122. A read signal rd illustrated in FIGS. 3a–3c is supplied to the control input of the multiplexer 124. When the read signal rd is asserted, the output signal of the multiplexer 122 is supplied to the output of the multiplexer 124. When the rd signal is deasserted, the output signal of the OR gate 120 passes to the output of the multiplexer 124.

The third stage of the interrupt capture and storage mechanism 100 acts as a read control circuit when a host CPU reads interrupt requests from the capture and storage mechanism 100. To provide reading of interrupt requests, the host CPU may assert the read signal rd during one or more periods of the clock signal clk. When the rd signal is asserted, a positive edge detecting circuit (not shown) produces the read reset signal rd_rst, which has a positive edge coinciding with the positive edge of the rd signal. The rd_rst signal is active during one period of the clock signal clk. Thus, the rd_rst signal indicates the beginning of a read operation.

Once the int_pos_edge signal is received by the third stage, interrupt event data corresponding to this signal is stored in the D flip-flop 126 until the rd and rd_rst signals are asserted. During a period of the clock signal clk when the rd and rd_rst signals are both active, a logic 0 is written into the D flip-flop 126, resetting its content. As will be explained in more detail later, after that clock period, the D flip-flop 126 is ready to receive interrupt event data carried by the int_pos_edge signal.

The fourth stage of the interrupt capture and storage mechanism 100 composed of a multiplexer 128 and a D flip-flop 130 acts as an interrupt register in the interrupt management block. The logic 0 input of the multiplexer 128 is connected to the Q output of the D flip-flop 126, whereas the logic 1 input of the multiplexer 128 is coupled to the Q output of the D flip-flop 130. The read signal rd is supplied to the control input of the multiplexer 128. The D input of the D flip-flop 130 is connected to the output of the multiplexer 128. When the rd signal is asserted, the Q output of the D flip-flop 130 is fed back to the D input of the flip-flop 130 to maintain the content of the D flip-flop 130 unchanged during a read operation. When the rd signal is deasserted, the Q output of the D flip-flop 126 is coupled to the D input of the D flip-flop 130 to transfer interrupt event data from flip-flop 126 to the flip-flop 128.

The D flip-flop 130 stores interrupt data representing interrupt events captured by the interrupt capture and storage mechanism 100, and produces interrupt request bits intr_ bits supplied from the Q output of the flip-flop 130 to the PCI bus 12 for transferring to the CPU.

As discussed above, the Q outputs of all D flip-flops in the interrupt capture and storage mechanism 100 change on the rising edge of the clock signal clk supplied to the CK inputs of the D flip-flops. The reset inputs R of the flip-flops 104, 110, 112, 114, 126 and 130 are supplied with a reset signal from a reset circuit that may be arranged in the PCI bus interface unit 16.

FIGS. 3a, 3b and 3c illustrate different timing relationships between the int_pos_edge signal, and the read signal rd. As shown in FIG. 3a, if the int_pos_edge signal is asserted simultaneously with the rd signal, the interrupt request bits intr_bits are produced in the next clock cycle after the rd signal is deasserted.

As illustrated in FIG. 3b, if the int_pos_edge signal is active one clock period before the rd signal is asserted, the interrupt event data corresponding to the int_pos_edge signal may be registered by the D flip-flop 130 only if the int_pos_edge signal has a duration that exceeds two clock periods. During the first clock period after the int_pos_edge signal is asserted, the interrupt event data cannot be registered because the rd signal is not asserted to read this data. During the second clock period, the interrupt event data is blocked by the multiplexer 122 controlled by the asserted rd_rst signal. During the third clock period, the interrupt event data is written to the D flip-flop 126 of the third stage. As soon as the rd signal is deasserted, the interrupt event data is transferred to the D flip-flop 130 of the fourth stage. The interrupt request bits intr_bits are produced in the next clock cycle after the rd signal is deasserted.

As illustrated in FIG. 3c, if the intr_pos_edge signal is asserted two clock periods before the rd signal is activated, the interrupt event data corresponding to the intr_pos_edge signal is registered by the flip-flops in the third and fourth stages before the rd and rd_rst signals are asserted. As soon as the read operation is initiated by the rd signal to read interrupt request data corresponding to the intr_pos_edge signal, the flip-flop 130 produces the interrupt request bits intr_bits.

Thus, the interrupt capture and storage mechanism 100 of the present invention captures and reports interrupt events that occur before, during or after the read operation initiated by the system to read interrupt requests.

There, accordingly, has been described a mechanism that captures and reports interrupt events occurred in various portions of a network interface controller. As different clocks control these interface controller portions, the interrupt request signals corresponding to the interrupt events are created in different clock domains. The first stage of the mechanism for capturing and reporting interrupt events detects interrupt events having different duration, and produces an interrupt synchronizing signal asserted during at least one period of a local clock signal. The second stage serves as a positive edge detector to produce an interrupt positive edge detect signal asserted during three clock periods. The third stage supports a read operation performed by a host signal corresponding to the detected interrupt event to read an interrupt request. Finally, the fourth stage of the mechanism for capturing and reporting interrupt events acts as an interrupt register to store an interrupt signal corresponding to the detected interrupt event and to produce an interrupt request signal sent to the host.

In this disclosure, there are shown and described only the preferred embodiments of the invention, but it is to be understood that the invention is capable of changes and modifications within the scope of the inventive concept as expressed herein.

What is claimed is:

1. In a data communications system controlled by a host, an interrupt management circuit comprising:
    an interrupt event detector for receiving an interrupt event signal in response to events that require interrupt requests to be sent to said host, said events occurring in different circuits controlled by separate independent clocks,
    an edge detector responsive to an interrupt synchronizing signal produced by said interrupt event detector for generating an interrupt edge signal having a duration equal to a predetermined number of periods of a local clock signal controlling said interrupt management circuit,
    an interrupt read circuit responsive to a read signal from said host for storing interrupt event data represented by said interrupt edge signal, and
    an interrupt register responsive to said interrupt event data transferred from said interrupt read circuit for producing interrupt request bits sent to said host.

2. The circuit of claim 1, wherein duration of said interrupt event signal represents a time period during which the event represented by said interrupt event signal occurs.

3. The circuit of claim 2, wherein said interrupt event signal has variable duration.

4. The circuit of claim 3, wherein said interrupt event detector comprises a first flip-flop for receiving said interrupt event signal, and a second flip-flop coupled to said first flip-flop for producing said interrupt synchronizing signal.

5. The circuit of claim 4, wherein said interrupt event detector further comprises a first OR gate having a first input coupled to an output of said first flip-flop, a second input coupled to an output of said second flip-flop, and an output connected to a data input of said first flip-flop.

6. The circuit of claim 5, wherein said interrupt event signal is supplied to a reset input of said first flip-flop.

7. The circuit of claim 6, wherein said edge detector is adapted to produce said interrupt edge signal having an edge that coincides in time with an edge of said interrupt synchronizing signal, and duration equal to three periods of said local clock signal.

8. The circuit of claim 7, wherein said edge detector comprises third, fourth and fifth flip-flops, and a second OR gate having a first input coupled to an output of said second flip-flop, a second input coupled to an output of said third flip-flop, and a third input connected to an output of said fourth flip-flop.

9. The circuit of claim 8, wherein said edge detector further comprises a gate responsive to outputs of said second OR gate and said fifth flip-flop for producing said interrupt edge signal.

10. The circuit of claim 9, wherein said interrupt read circuit comprises a sixth flip-flop and a third OR gate having a first input coupled to an output of said sixth flip-flop and a second input supplied with said interrupt edge signal.

11. The circuit of claim 10, wherein said interrupt read circuit further comprises a first multiplexer coupled between an output of said third OR gate and input of said sixth flip-flop and controlled by said read signal.

12. The circuit of claim 11, wherein said interrupt read signal further comprises a second multiplexer coupled between the output of said OR gate and an input of said first multiplexer and controlled by a read reset signal for resetting contents of said sixth flip-flop.

13. The circuit of claim 12, wherein said interrupt register comprises a seventh flip-flop for producing said interrupt request bits, and a third multiplexer having a first input connected to an output of said seventh flip-flop and a second input coupled to an output of said sixth flip-flop.

14. The circuit of claim 13, wherein said third multiplexer is controlled by said read signal for maintaining the contents of said seventh flip-flop unchanged during an interrupt request read operation.

15. A data communication network comprising:
    a host, and
    a network adapter coupled to said host via a PCI bus,
        said network adapter having an interrupt capture and storage mechanism responsive to interrupt events of variable duration for producing an interrupt request signal transferred to said PCI bus to report said events to said host.

16. A data processing system, comprising:

a host, and an interrupt capture mechanism responsive to interrupt events occurring in different circuits controlled by separate clocks, for producing an interrupt request signal supplied to the host to report said interrupt events.

17. The system of claim 16, wherein a duration of an interrupt signal representing at least one of said interrupt events is less than a duration of a local clock signal that controls an interrupt circuit including said interrupt capture mechanism.

18. The system of claim 16, wherein said interrupt capture mechanism comprises an interrupt event detector for detecting the interrupt events having different duration for producing an interrupt synchronizing signal.

19. The system of claim 18, wherein said interrupt capture mechanism further comprises an edge detector responsive to said interrupt synchronizing signal for producing an interrupt edge signal having a duration equal to a predetermined number of periods of a local clock signal that controls an interrupt circuit including said interrupt capture mechanism.

20. The system of claim 19, wherein said interrupt capture mechanism further comprises an interrupt read circuit responsive to a read signal from the host for storing interrupt event data represented by said interrupt edge signal.

* * * * *